Patented Oct. 3, 1950

2,524,073

UNITED STATES PATENT OFFICE 2,524,073

DYEING CELLULOSE ESTERS AND ETHERS WITH ALKALINE AQUEOUS SOLUTIONS OF LEUCO VAT DYES CONTAINING DIACETONE ALCOHOL

Henry Charles Olpin and Edmund Stanley, Spondon, near Derby, England, assignors to Celanese Corporation of America, a corporation of Delaware No Drawing. Application July 13, 1948, Serial No. 38,544. In Great Britain July 28, 1947

5 Claims. (Cl. 8—36)

This invention relates to the colouration of textile materials and more particularly to the colouration with vat dyes of textile materials of cellulose acetate or other organic derivative of cellulose, that is of other cellulose esters of organic acids or of cellulose ethers.

Notwithstanding the well known valuable properties of dyeings produced on cellulose fibres with the aid of vat dyes, the latter dyes have not been employed on any extensive scale for the colouration of cellulose acetate fibres. This is more particularly the case with the class of vat dyes containing two or more anthracene nuclei in the molecule and which includes many vat dyes of very great value on account of the high resistance of their dyeings to light and other agencies. This is due to the fact that cellulose acetate cannot be dyed with these vat dyes by the well known and easily practised alkaline vat technique as commonly used for cellulose fibres, at least if the cellulose acetate is to remain substantially unsaponified and to be permeated by the dye so that the latter resists removal by rubbing.

We have now devised a method whereby a wide range of vat dyes, including vat dyes containing two or more anthracene nuclei, can be satisfactorily applied to cellulose acetate fibres without material saponification of the latter and so that the dyes permeate the substance of the fibres. In our new process the dye is applied to the cellulose acetate fibres in the form of a leuco compound in an aqueous medium which is acid, neutral, or faintly alkaline (e. g. of pH value from 9 or 10 to 11 or 11.5) and which contains sufficient of a suitable water-miscible organic liquid to impart to the medium a substantial swelling action on the cellulose acetate. Swelling of the cellulose acetate fibres is usually accompanied by a shrinkage in the direction of their length. The medium may indeed be such as to shrink cellulose acetate fibres by 10, 15, or 20 per cent or more of their length if they are immersed therein for 5 minutes, under little or no restraint. On the other hand for some purposes the medium may advantageously be such as does not substantially shrink cellulose acetate fibres under the said conditions. Diacetone alcohol has been found a very effective organic liquid for the new process. The most useful dye liquids appear to be those having a pH value of between 8 and 10.5, such liquids permitting very good results to be obtained with a very wide range of vat dyes.

We use the term "leuco compound of a vat dye" in its ordinary sense of a free leuco compound or a salt thereof with a base; we do not use the term as including the well known esters of leuco compounds with sulphuric or other acids.

Various methods of preparing the dyeing medium can be used. One method is to vat the dye in water with alkali, for example caustic soda or other caustic alkali, and a reducing agent, for example sodium hydrosulphite, and then to add the requisite organic liquid and sufficient acid to bring the medium to the desired acid, neutral or faintly alkaline condition, the organic liquid and acid being preferably added in this order. The leuco compound of the vat dye is possibly then partially or wholly in the free state and no longer entirely in the form of the alkali metal salt produced by the alkaline vatting operation.

The most useful acids for reducing or neutralizing the alkalinity of the medium are those which are weaker than acetic acid, for example acids having dissociation constants (for the first hydrogen atom where more than one is present) less than $1 \times 10^{-6}$ and especially those having dissociation constants less than $1 \times 10^{-8}$. Examples of such weak acids are boric acid, carbonic acid, and amino acetic acid, alpha-amino propionic acid and other alpha-amino-aliphatic acids. Boric acid, amino acetic acid and alpha aminopropionic acid have dissociation constants of the order of $1 \times 10^{-9}$. Another class of acids which may be employed are aromatic hydroxy compounds, for example hydroxybenzenes, e. g. phenol, cresols, resorcinol, hydroquinone and tannic acid, and hydroxynaphthalenes, e. g. alpha- and beta-naphthol. Phenol and hydroquinone for instance have dissociation constants in the region of $1 \times 10^{-10}$. Again sugars, including reducing sugars, can be employed e. g. glucose, fructose, lactose, and maltose, likewise sulphite cellulose lye and various purified forms thereof.

The acid is preferably such that when used in a proportion of one molecular proportion to each molecular proportion of the caustic alkali employed in the preparation of the vat, does not cause precipitation of the reduced vat dye; it can be used in at least this proportion though a smaller proportion is often sufficient to lower the pH value to the desired extent. It appears that the caustic alkali employed in preparing the vat is partly neutralised by decomposition products of the hydrosulphite reducing agent.

With some vat dyes e. g. many indigoid dyes, acids as strong as or stronger than acetic acid (e. g. acids having dissociation constants as high as $2 \times 10^5$) can be used and dye baths obtained which are sufficiently stable for practical purposes and yield good colour value on cellulose acetate material, particularly if the acid is used in a proportion lower than that corresponding to the caustic alkali employed in vatting the dye. With other vat dyes however, notably indanthrone and its halogen and other derivatives weaker acids, such as those of dissociation constant less than $1 \times 10^{-8}$ referred to above, are much to be preferred. Boric acid, which is a polybasic acid, is especially valuable and may be used without detriment in a proportion somewhat in excess of one molecular proportion to each molecular proportion of caustic alkali employed.

When using acids of dissociation constants less than about $1 \times 10^{-8}$ or $1 \times 10^{-9}$ it appears that the pH value of the dye liquid does not fall below about 8 or 9 even when the acid is used in greater proportion than one molecular proportion to each molecular proportion of caustic alkali employed. At the same time they ensure that the pH value of the dye liquid is at no time so high as to lead to saponification of the material. The use of such acids enables the pH value of the dye liquor to be brought to and maintained within the desired range with great ease and without precise adjustment of ratio of acid to alkali. This is not possible when using strong acids.

The dye liquids used in accordance with the new process and prepared in the foregoing manner by addition of the water miscible organic liquid and a suitable acid to a vat of the vat dye, the latter prepared with caustic alkali and sodium hydrosulphite or other reducing agent, thus include such as have a pH value above 8, 9 or 10 but below 11 or 11.5 and in particular below 10.5 and may be regarded as containing a leuco compound of a vat dye, the water-miscible organic liquid, and a salt of an alkali metal with an acid having a dissociation constant of less than about $2 \times 10^{-5}$, particularly an acid having a dissociation constant of less than $1 \times 10^{-8}$ or $1 \times 10^{-9}$. Dye liquids of these characteristics are of very great value for colouring cellulose acetate fibres even in the absence of the water-miscible organic liquid.

A second method of preparing the dye liquids is to effect vatting of the dye with sodium hydrosulphite or other reducing agent in the presence of an alkali metal salt of a weak acid, the water-miscible organic liquid being present during the vatting or added afterwards. Thus the dye may be vatted with sodium hydrosulphite and sodium borate, sodium phenate, or the sodium salt of other of the acids indicated above as suitable for use in the first mentioned method of preparing the dye liquids.

A third method of preparing the dye liquids is to effect vatting with sodium hydrosulphite or other reducing agent in the presence of a weak alkali such as ammonia, the water-miscible organic liquid being present during the vatting or added afterwards.

The water-miscible organic liquid should be a polar compound and is preferably aliphatic. In the undiluted state it can be a solvent for cellulose acetate. It may be a hydroxy compound, a ketone, an ester, an ether, or a halogen compound. The best results, both from the point of view of the character of the coloured products and the stability of the dye liquid, seem to be obtained with compounds containing two groups or atoms of the kind commonly referred to as polar and particularly with compounds containing a hydroxy group and a polar group or atom of another kind, for example a keto group —CO—, an ester group —CO.O—, an ether oxygen —O—, or a halogen atom.

As examples of such compounds may be mentioned, in addition to diacetone alcohol already referred to, partial carboxylic esters of aliphatic di- or poly-hydric alcohols, e. g. glycol mono acetate and glycerol diacetate, partial ethers of aliphatic di- or poly-hydric alcohols, e. g. glycol mono-methyl or mono-ethyl ether, ester of hydroxy carboxylic acids, e. g. ethyl lactate, halogen hydrins, e. g. ethylene chlorhydrin or propylene chlorhydrin, and water-miscible ethers, e. g. ethylene-methylene ether. An example of a suitable compound which contains two polar groups but no hydroxy group is glycol monomethyl ether acetate.

Water-miscible aliphatic mono-alcohols, for example methyl alcohol, ethyl alcohol, propyl alcohols or butylalcohols can be employed though, when they are used in sufficient proportion to impart to the dye liquid a very strong swelling action on the cellulose acetate fibres, the stability of the dye liquid is often not so good as when diacetone alcohol or other liquid containing at least two polar groups is employed. If desired inorganic substances of which aqueous solutions are capable of swelling cellulose acetate fibres may be included in the dye liquid for example sodium, potassium, ammonium, zinc, or other thiocyanate.

Dispersing agents and/or wetting agents may be included in the dye liquids, and their inclusion frequently results in a worth-while increase in the stability of the dye baths. The dispersing and/or wetting agents employed should be such as are effective in neutral and acid media as well as in slightly alkaline media. They may be, for example, alkylated aromatic sulphonic acids or long chain alkyl sulphonic acids. Another type of sulphonic acid dispersing agent which has been found of value is the class of condensation products of naphthalene sulphonic acids with formaldehyde. Other types of dispersing agents or wetting agents stable and effective in neutral or slightly acid media as well as in slightly alkaline media can, however, be used, for example the sulphuric esters of long chain aliphatic alcohols and non-ionic dispersing agents, e. g., condensation products from long chain alcohols or acids with several molecular proportions of ethylene oxide. A mixture of a formaldehyde/naphthalene sulphonic acid condensation product and Oranit BNX (which appears to be an alkylated aromatic sulphonic acid, or a long chain alkyl sulphonic acid) has been found very useful. A formaldehyde sulphoxylate may advantageously be included in the dye liquids, particularly if the latter are to be applied at high temperatures, e. g. 50° or over.

The proportion by weight of water-miscible organic liquid required in the dye liquid for best results depends upon the liquid itself, the temperature and upon the method of using the dye liquid, as hereinafter explained. In general the water-miscible organic liquid should constitute at least 15% by weight of the organic liquid and water together, but a much higher proportion of organic liquid is often desirable, e. g. at least 30%. When the water-miscible liquid is one which yields, with water, mixtures which dissolve cellulose acetate (which is the case with many of the liquids enumerated above), the proportion used may approach, but of course not reach, that which would make the dye liquid a solvent for cellulose acetate. For instance, the proportion may be 45–55%, e. g. about 50%, in the case of diacetone alcohol; 30–40%, e. g. about 35%, in the case of glycol monomethyl ether acetate; and 25–35%, e. g. about 30%, in the case of acetic acid.

The invention does, however, particularly contemplate the use of dye liquids containing water, and the latter should constitute a substantial proportion of the liquid content of the dye liquid, for example at least 20% and preferably at least 30% or 40%.

The lower proportions of water-miscible organic liquid, that is proportions such that the dye liquid exerts but a moderate degree of swelling on the cellulose acetate, are more particularly useful when it is desired that the cellulose acetate material should take up the dye substantively from the dye liquid. When this is required the dye liquid may advantageously contain from 15% to 25% of methyl, ethyl, or a propyl alcohol or of diacetone alcohol, based on the alcohol and water together. Under these circumstances it is possible to obtain very good exhaustion of the dye from the dye liquid, and dyeing can be conducted in the conventional manner, that is by immersing the cellulose acetate material in the dye liquid containing the required proportion of dye and working it therein at, say 50°–70° C., or even 80° C. until the dye is substantially exhausted.

The higher proportions of water-miscible organic liquid (for example 30% or more, based on the water-miscible liquid and water together) or those which lead to substantial shrinkage of cellulose acetate fibres, are of most value when the dye liquid is to be applied by mechanical impregnation methods, for example padding or printing, or a short immersion followed by centrifuging. When using such high proportions, the vat dyes as a rule exhibit little or no substantive affinity for the cellulose acetate material, the dye taken up being substantially only that in the liquid retained by the material. This is an advantage rather than otherwise when mechanical impregnation methods such as padding are employed, since owing to the absence of substantive absorption, the concentration of the dye in the liquid contained in the trough of the padding device remains substantially unchanged as the material passes through. When mechanical impregnation methods such as padding, or other methods involving a relatively short time of passage of the material through the dye liquid, are employed, care should be taken that the time of contact between the material and the dye liquid is not too short. From the point of view of obtaining a high degree of uniformity of colouration, the material is advantageously in contact with the dye liquid for a period in excess of one or two minutes, for example about five minutes.

As indicated above, the dye liquid may contain a thiocyanate. Thus a thiocyanate may be included in those dye liquids which contain alkali metal salt of an acid having a dissociation constant of the order of that of acetic acid or lower. The dye liquid may for instance contain from 0.5 to 5% of thiocyanate based on the weight of the water and water-miscible organic liquid and the latter may be diacetone alcohol to the extent of 20 to 35% or more on the same basis. These thiocyanate-containing dye liquids may be employed at a temperature of 40° C. or more though the latter should not as a rule exceed 70° C. The duration of immersion of the cellulose acetate material in these thiocyanate-containing liquids may be from 15 seconds to 1 or 2 minutes.

For application by mechanical impregnation, the dye liquids may if desired, be thickened in any convenient way, for example with a water-soluble alkyl cellulose, e. g. methyl cellulose or hydroxy-ethyl cellulose. Following the impregnation, the material may, if desired, be steamed though this is not essential for good results, especially when the material has been in contact with the dye liquid for a period such as that indicated above.

Following the dyeing or mechanical impregnation of the material, and steaming if employed, the leuco vat dye on the material may be oxidised to the parent vat dye in any convenient way, preferably after washing the material to remove the water-miscible organic liquid. This may be accomplished by air oxidation or by the use of an aqueous solution of an oxidising agent e. g. an aqueous solution of a perborate or percarbonate (e. g. 1 gram per litre), an aqueous alkaline solution of hydrogen peroxide, or an acidified aqueous solution of a chromate (e. g. an aqueous solution prepared with 0.1 to 0.5% sodium bichromate and 0.3 to 1.0% acetic acid and which may be used at 20 to 40° C.).

After the oxidation of the leuco vat dye to the parent dye on the material, the latter is advantageously given a hot soaping treatment e. g. at 70°–80° C. or even at temperatures up to the boil, in order to ensure that the shade of the dye is properly developed. If desired a steaming treatment may be employed for this purpose in place of or in addition to the hot soaping treatment. Steaming frequently raises the fastness to light of the dyeings to a substantial extent.

The vat dyes which can be applied by the new process include, as already mentioned, dyes containing two or more anthracene nuclei for example:

(a) dibenzanthrone and iso-dibenzanthrone and their halogenated or alkoxy derivatives, e. g. dimethoxy-dibenzanthrone, halogenated dimethoxy-dibenzanthrones, and halogenated iso-dibenzanthrones, (b) indanthrone and halogen derivatives thereof, (c) dyes obtainable by ring closure of Bz1-benzanthronyl-1-amino-anthroquinones, (d) anthraquinone carbazoles obtainable by ring closure of alpha-alpha′-di- and poly-anthrimides with concentrated sulphuric acid, e. g. the products thus obtainable from 5:5′-dibenzoylamino-1:1′-dianthraquinonylamine.

An important feature of our new process is that in the case of fabrics containing both cellulose acetate fibres and cellulose fibres it is possible to colour the cellulose acetate while leaving the cellulose uncoloured. In general it appears that there is little tendency for the dye liquids to colour cellulose if the pH value is below about 10.5. Even at higher pH values the tendency seems small when the proportion of water-miscible organic liquid present is within the higher ranges specified above. In the case of materials containing both cellulose acetate fibres and cellulose fibres valuable two colour effects can readily be obtained. The colouring of the cellulose fibres can indeed be effected with vat dyes if conditions are such that the cellulose acetate is not simultaneously coloured, for example by suitable choice of dye and using aqueous alkaline vats of low alkalinity and/or at a low temperature. Such vats can be prepared by vatting the dye with caustic alkali and hydrosulphite, and so reducing the alkalinity of the vat that the latter does not saponify the cellulose acetate substantially for example by addition of glucose or other sugar, or phenol, cresol or other aromatic hydroxy compound (compare Specification 262,506 of British Celanese Limited) or other weak acid, e. g. boric acid or carbonic acid, the latter conveniently in the form of sodium bicarbonate.

Another method of colouring the cellulose fibres is to make use of sulphuric esters of leuco vat dyes. The material is advantageously mechanically impregnated with a solution of the sulphuric ester under such conditions that the cellulose acetate component of the material is not substantially swollen, thus preventing the latter from being coloured by the sulphuric ester. Following the impregnation, the sulphuric esters are converted back to the parent dyes on the cellulose fibres in the customary manner. It is thus possible to colour both the cellulose acetate fibres and the cellulose fibres in shades of a very high order of fastness both to light and to washing.

The cellulose fibres of such mixed materials may be cotton fibres or fibres of regenerated cellulose, for example those produced from viscose solutions or cuprammonium solutions of cellulose or produced by saponifying cellulose ester fibres which have been stretched substantially, e. g. in steam or hot water.

The invention is illustrated by the following examples, the "parts" referred to being parts by weight.

*Example 1*

5 parts of Caledon Jade Green B are vatted with 200 parts of water, 27.5 parts of aqueous caustic soda (10% strength) and 5 parts of sodium hydrosulphite. To the cool vat is added 235 parts of diacetone alcohol followed by 25 parts of aqueous acetic acid (10% strength) the latter being added slowly with good stirring. The temperature is adjusted to 20–25° C. and a cotton fabric having a pattern in continuous filament cellulose acetate yarn woven therein is immersed in the liquid for 5 minutes. The fabric is then washed well in cold water, oxidised to convert the leuco vat dye to the parent vat dye, and finally soaped, rinsed and dried. The cellulose acetate is coloured a green shade of medium depth, the cotton remaining undyed.

The following vat dyes can be applied similarly:

Caledon Jade Green B
Caledon Jade Green 4G
Caledon Olive Green B
Caledon Brilliant Blue 3G
Caledon Red X5B
Caledon Brilliant Purple 2R
Caledon Yellow-Brown 3G
Caledon Dark Brown 6R

*Example 2*

0.2 parts of Caledon Jade Green B300 powder are vatted for 10 minutes at about 50° C. with 1.7 parts of 10% caustic soda solution, 0.2 parts of sodium hydrosulphite and 23 parts of water. The vat is then added to a mixture of 290 parts of water, 75 parts of diacetone alcohol and 1 part of the sodium salt of a condensation product of formaldehyde with naphthalene sulphonic acid, 2 parts of Oranit BNX, 0.5 parts of sodium formaldehyde sulphoxylate and 3 parts of acetic acid of 10% strength.

10 parts of cellulose acetate woven fabric is immersed in the dye liquid so prepared and worked therein for 1 hour at a temperature of 60–65° C. The fabric is then rinsed and oxidised by treatment for 30 minutes at 60° C. in a 1 gram per litre solution of sodium percarbonate. Finally the material is soaped for ½ hour at 75–80° C. in a 2 grams per litre soap solution, washed off and dried. A full blue-green shade is obtained on the material, the dye being almost completely exhausted from the liquid.

Similar results may be obtained by replacing the Caledon Jade Green B by one of the following dyes:

Caledon Yellow 2R
Caledon Gold Orange 3G
Caledon Brilliant Orange 6R
Caledon Brilliant Red 3B
Caledon Printing Purple 4R
Caledon Green 2G
Caledon Brown R
Caledon Yellow Brown 3G
Caledon Dark Brown 6R
Durinone Brown G
Durinone Blue 4BC If the cellulose acetate fabric is replaced by one woven from a mixture of cellulose acetate yarns and regenerated cellulose yarns produced by the viscose process (for example a fabric of this kind showing a cellulose acetate pattern upon a regenerated cellulose ground), the cellulose acetate alone is dyed, the regenerated cellulose remaining substantially uncoloured.

*Example 3*

35 litres of dye liquid are prepared as follows: 175 grams of Caledon Red Violet 2RN 300 powder are vatted with 5 litres of soft water, 105 grams of caustic soda flakes, 260 grams of sodium hydrosulphite, 175 grams of a formaldehyde/naphthalene sulphonic acid condensation product and 350 grams of Oranite BNX solution, the vatting being effected at ordinary temperature. The vat so obtained is added to 15 litres of diacetone alcohol and 10 litres of soft water. After stirring for a short time, 125 ccs. of glacial acetic acid diluted with 3,250 ccs. of soft water are stirred in, and the temperature adjusted to 25° C. A woven patterned fabric composed of cellulose acetate yarn in association with cotton yarn is passed through this liquid at such a speed that the time of immersion is about 5 minutes. The material is then rinsed, oxidised and soaped in the manner described in Example 2. The cellulose acetate is thereby dyed in a bluish-red shade, the cotton being only very slightly stained.

Other vat dyes can be applied to the cellulose similarly, for example:

Caledon Yellow 2R
Caledon Jade Green 3B
Caledon Olive Green B
Caledon Red BN
Caledon Red X5B
Caledon Dark Brown 3R
Caledon Printing Purple 4R
Durindone Blue 4BC
Durindone Brown G If desired, the cotton may then be dyed with vat dyes by applying the latter in the form of a caustic soda/hydrosulphite vat containing glucose and prepared with the minimum quantity of caustic soda necessary for the particular dye employed. Alternatively, the cotton may be coloured by padding with a sulphuric ester of a leuco vat dye such as one of those sold under the trade names of Soledon and Indigosol, and the vat dye developed by acid oxidation in the usual way. For example, the cotton may be coloured to a beige shade using a mixture of Indigosol Brown IBR and Indigosol Golden Yellow IRK.

The dyeing of the cellulose acetate portion of the material may be effected with the aid of an apparatus comprising a shallow V-shaped trough provided with rollers at the end of each arm of the V, and a third roller inside the vat and close to the apex, so that the fabric may be passed into the vat over one roller, down through the vat under the bottom roller and out over the next end roller. The apparatus may be used in association with a mangle to squeeze the fabric as it leaves the dye bath, so that it retains but a predetermined proportion of dye liquid. The interior of the V-shaped vat may be provided with a V-shaped member arranged so as to leave but a narrow space for the passage of the fabric through the vat between the sides thereof and the said V-shaped member. The volume of dye liquid necessary to afford a given length of passage of the fabric through the dye bath can thus be greatly reduced.

*Example 4*

1.75 parts of Caledon Olive Green B 200 paste are vatted with 50 parts of water, 16.5 parts of 10% caustic soda solution, and 1.5 parts of sodium hydrosulphite, and the vat is added to a mixture of 675 parts of water, 190 parts of diacetone alcohol, 2.5 parts of the sodium salt of a condensation product of formaldehyde with naphthalene sulphonic acid, 5 parts of Oranit BNX solution, and 2 parts of sodium formaldehyde sulphoxylate. To the whole mixture is added 1.5 parts of boric acid in 50 parts of water. A cellulose acetate woven fabric (20 parts) is worked in the dye bath so obtained for 1 hour at 55° C., and is then rinsed, oxidised and soaped as described in Example 2. A medium shade of green is obtained. A stable dye liquid is more easily obtained than when stronger acids such as acetic acid are used in place of the boric acid for reducing the alkalinity of the liquid.

*Example 5*

1.75 parts of Caledon Olive Green B200 paste is vatted with 50 parts of water, 35 parts of ammonia (S G .880) and 4 parts of sodium hydrosulphite. The vat is added to 860 parts of water and 50 parts of butyl alcohol. A cellulose acetate woven fabric (20 parts) is worked in the dye liquid so prepared for 10 minutes at 55° C. Rinsing, oxidation and soaping are then effected as described in Example 4.

*Example 6*

1.75 parts of Caledon Olive Green B 200 paste are vatted with 50 parts of water, 32 parts of caustic soda solution (10%) and 3 parts of sodium hydrosulphite. The vat is added to a mixture of 660 parts of water, 3.5 parts of sodium formaldehyde sulphoxylate, and 15 parts of Dispersol VL solution (a non-ionic dispersing agent); to the whole is added 5 parts of boric acid and 195 parts of methylated spirit. A cellulose acetate woven fabric (20 parts) is dyed in the resulting dye liquid for one hour at 75° C. and washed off in water containing 1 cc. per litre of Dispersol VL at 60° C. Oxidation and soaping then follow as described in Example 4. Alternatively oxidation can be effected at 60° C. in water containing per litre 5 cc. of hydrogen peroxide (20 volumes or 6%), 0.5 gram of Alcos A (a sulphated fatty alcohol) and 0.25 gram of sodium carbonate, and the soaping replaced by a scour in water containing 2 grams per litre of Alcos A at 75 to 80° C.

An excellent green shade is obtained. Other vat dyes can be applied in similar manner, for example Caledon Brilliant Red 3B, Caledon Yellow 2R, Caledon Brilliant Orange 6R, Caledon Jade Green XN, Caledon Dark Blue G, and Caledon Brown R.

*Example 7*

1.75 parts of Caledon Olive Green B 200 paste are vatted with 140 parts of water, 3 parts of caustic soda flakes, 7.5 parts of sodium hydrosulphite, 5 parts of a formaldehyde/naphthalene sulphonic acid condensation product (sodium salt) and 10 parts of Oranit BNX solution. The vat is then added to a mixture of 425 parts of diacetone alcohol and 290 parts of water. To the dye liquid so obtained is added 3-5 parts of boric acid, and cellulose acetate fabric is immersed in the liquid for 5 minutes at about ordinary temperature (25° C.). The fabric is then rinsed, oxidised in water containing 5 cc. per litre of hydrogen peroxide of 6% strength, and soaped in the manner described in Example 2. An olive-green shade is thus obtained.

The Caledon Olive Green B may be replaced by other vat dyes, for example any of those mentioned in the preceding examples. Further, the method of this example yields useful colouration when the dye is indanthrone or its halogen or other derivatives, for example Caledon Blue RN, Caledon Blue 3G and Caledon Blue GCP, a stable dye liquid being much more easily obtained than when stronger acids are used for neutralising or reducing the alkalinity of the dye liquids.

The boric acid may be increased up to 4.5 or 5 parts or may be replaced by an amount of phenol or glycine equivalent to the caustic soda employed.

The process of the invention has been described more particularly in connection with the colouring of cellulose acetate fibres. It can however be applied for the colouration of fibres of other cellulose esters or of cellulose ethers, and especially of cellulose esters of other lower fatty acids, e. g. cellulose acetate-propionate, cellulose acetate-butyrate and cellulose propionate. The process can be applied to the fibres in various forms, e. g. as continuous filament yarns or fabrics containing them, or staple fibre products, e. g. loose staple fibre, rovings, yarns, or fabrics.

Having described our invention, what we desire to secure by Letters Patent is:

1. Process for the coloration of textile material of a compound selected from the group consisting of cellulose esters of organic acids and cellulose ethers with a vat dye, which comprises allowing the material to substantially absorb the leuco vat dye from an aqueous medium having a pH value below 11.5, said medium containing an alkali metal salt of an acid of dissociation constant less than $10^{-5}$ and containing sufficient diacetone alcohol to impart to the medium a substantial swelling action on the cellulose derivative, and thereafter directly washing the material and oxidizing the leuco compound to the parent vat dye.

2. Process for the coloration of textile material of cellulose acetate with a vat dye, which comprises allowing the material to substantially absorb the leuco vat dye from an aqueous medium having a pH value below 11.5, said medium containing an alkali metal salt of an acid of dissociation constant less than $10^{-5}$ and containing sufficient diacetone alcohol to impart to the medium a substantial swelling action on the cellulose acetate, and thereafter directly washing the material and oxidizing the leuco compound to the parent vat dye.

3. Process for the coloration of textile material of cellulose acetate with a vat dye, which comprises allowing the material to substantially absorb a leuco compound of the vat dye from an aqueous medium having a pH value below 11.5, said medium containing an alkali metal salt of an acid of dissociation constant less than $10^{-5}$ and from 15–25% of diacetone alcohol based on the weight of diacetone alcohol and water together, and thereafter directly washing the material and oxidizing the leuco compound to the parent vat dye.

4. Process for the coloration of textile material of cellulose acetate with a vat dye, which comprises allowing the material to substantially absorb a leuco compound of the vat dye from an aqueous medium having a pH value below 11.5 and a temperature of 50–80° C., said medium containing an alkali metal salt of an acid of dissociation constant less than $10^{-5}$ and from 15–25% of diacetone alcohol based on the weight of diacetone alcohol and water together, and thereafter directly washing the material and oxidizing the leuco compound to the parent vat dye.

5. Process according to claim 4 wherein the dye liquor contains a formaldehyde sulphoxylate.

HENRY CHARLES OLPIN.
EDMUND STANLEY.

REFERENCES CITED

The following references are of record in the file of this patent:

UNITED STATES PATENTS

| Number | Name | Date |
| --- | --- | --- |
| 2,107,526 | Dreyfus | Feb. 8, 1938 |
| 2,428,833 | Croft | Oct. 14, 1947 |

FOREIGN PATENTS

| Number | Country | Date |
| --- | --- | --- |
| 340,267 | Great Britain | Dec. 19, 1930 |
| 479,867 | Great Britain | Feb. 14, 1938 |
| 847,107 | France | June 26, 1939 |
| 592,858 | Great Britain | Oct. 1, 1947 |